US009636880B2

(12) United States Patent
Merkle et al.

(10) Patent No.: US 9,636,880 B2
(45) Date of Patent: May 2, 2017

(54) DRIVE DEVICE WITH A HYPOCYCLOID GEAR ASSEMBLY FOR A FORMING MACHINE

(71) Applicant: Schuler Pressen GmbH, Göppingen (DE)

(72) Inventors: Thomas Merkle, Schlat (DE); Roland Meier, Rechberghausen (DE); Carola Lebschy, Göppingen (DE)

(73) Assignee: SCHULER PRESSEN GMBH, Göppingen (DE)

( * ) Notice: Subject to any disclaimer, the term of this patent is extended or adjusted under 35 U.S.C. 154(b) by 94 days.

(21) Appl. No.: 14/663,998

(22) Filed: Mar. 20, 2015

(65) Prior Publication Data

US 2015/0266251 A1 Sep. 24, 2015

(30) Foreign Application Priority Data

Mar. 21, 2014 (DE) ........................ 10 2014 103 927

(51) Int. Cl.
*B21D 51/26* (2006.01)
*F16H 21/36* (2006.01)
(Continued)

(52) U.S. Cl.
CPC .............. *B30B 1/266* (2013.01); *B21D 51/26* (2013.01); *B30B 15/0064* (2013.01); *F16H 21/365* (2013.01); *Y10T 74/18056* (2015.01)

(58) Field of Classification Search
CPC ... F16H 21/365; B30B 15/0064; B30B 1/266; B21D 51/26; Y10T 74/18056
See application file for complete search history.

(56) References Cited

U.S. PATENT DOCUMENTS 3,791,227 A * 2/1974 Cherry ...................... F01B 9/02 123/192.2
3,797,327 A * 3/1974 Voorhees ............ B30B 15/0064 100/292
(Continued)

FOREIGN PATENT DOCUMENTS

WO 2008046134 A1 4/2008

OTHER PUBLICATIONS

Office Action in corresponding German Application No. 102014103927.0 dated Aug. 13, 2014, 10 pages.

*Primary Examiner* — Sherry Estremsky
(74) *Attorney, Agent, or Firm* — Fitch, Even, Tabin & Flannery LLP

(57) ABSTRACT

A drive device (10) for a forming machine (11) includes a hypocycloid gear assembly (20) having an eccentric gear (23), a stationary annulus gear (24) and a planetary gear system (28). The planetary gear system (28) includes an orbiting gear (29) orbiting and rolling in an annulus gear (24). The orbiting gear (29) is connected to at least one first planetary gear (35). On the first planetary gear (35), a first planetary gear equalization mass ($m_2$) is disposed diametrically opposite an output bearing. At least one first eccentric gear equalization mass ($m_3$) is arranged on the eccentric gear (23). The first eccentric gear equalization mass ($m_3$) is arranged diametrically opposite, relative to a planetary gear axis (PA) about which the planetary gear system (28) rotates. The resultant forces and torques acting on the annulus gear (24) can at least be reduced by the equalization masses.

10 Claims, 3 Drawing Sheets

(51) Int. Cl.
*B30B 1/26* (2006.01)
*B30B 15/00* (2006.01)

(56) References Cited

U.S. PATENT DOCUMENTS

| | | | | |
|---|---|---|---|---|
| 4,361,056 | A * | 11/1982 | George | F16H 37/16 242/432.4 |
| 5,400,635 | A | 3/1995 | Kawaguchi et al. | |
| 6,510,831 | B2 | 1/2003 | Wiseman | |
| 7,434,442 | B2 * | 10/2008 | Gombas | B21D 22/30 72/347 |
| 8,894,530 | B1 * | 11/2014 | Read | F16H 21/365 123/197.4 |
| 2008/0041133 | A1 | 2/2008 | Gombas | |

* cited by examiner

DRIVE DEVICE WITH A HYPOCYCLOID GEAR ASSEMBLY FOR A FORMING MACHINE

RELATED APPLICATION(S)

This application claims the benefit of German Patent Application No. DE 10 2014 103 927.0 filed Mar. 21, 2014, the contents of which are incorporated herein by reference as if fully rewritten herein.

TECHNICAL FIELD

The invention relates to a drive device for a forming machine. The drive device comprises a hypocyloid gear assembly.

BACKGROUND

On the output side of the hypocycloid gear assembly, there is an output bearing that can be connected to a ram of a forming machine. Due to the hypocycloid gear assembly, the output drive—and thus a ram fastened thereto—moves linearly in a working direction. For example, a tool of the forming machine may be provided on the ram. Preferably, such a forming machine is disposed for forming blanks of metal, for example round blanks or cups, into hollow cylindrical bodies, for example, can bodies. Such a hollow cylindrical body has a bottom and a cylinder barrel surface.

For example, a drive device comprising a hypocycloid gear assembly for a forming machine has been known from U.S. Pat. No. 6,510,831 B2. The hypocycloid gear assembly comprises an annulus gear with internal toothing. The external toothing of a planetary gear meshes with the internal toothing of the annulus gear. The planetary gear is arranged so as to be rotatable about a planetary gear axis. In a manner radially offset relative to this planetary gear axis, there is a bearing that is connected to a piston rod. Diametrically opposite the bearing, relative to the planetary gear axis, there is provided a counter-weight on the planetary gear. A linear motion of a piston can be converted into a rotary motion via the hypocycloid gear assembly.

Furthermore, U.S. Pat. No. 5,400,635 describes a hypocycloid gear assembly for a forming machine. Therein, a rotating motion of a drive is converted into a linear motion of a push rod. The hypocycloid gear assembly comprises an annulus gear with internal toothing. A planetary gear is supported so as to be rotatable about a planetary gear axis and has external toothing meshing with the annulus gear. The pitch circle diameter of the planetary gear corresponds to the pitch circle radius of the annulus gear. An output bearing supporting a ram is provided on the planetary gear carrier. The planetary gear can be driven via an eccentric gear, said planetary gear rolling in the annulus gear. In doing so, the drive bearing moves linearly.

SUMMARY

Considering prior art, the improvement of a drive device comprising a hypocycloid gear assembly for a forming machine should be viewed as the object of the present invention.

An inventive drive device comprises a hypocycloid gear assembly with an annulus gear, a planetary gear system and an eccentric gear. The annulus gear may be provided with internal toothing, for example. The planetary gear system comprises a planetary gear or a orbiting gear that rolls inside the annulus gear and may be provided with corresponding external toothing, for example, said external toothing meshing with the internal toothing of the annulus gear at an engagement location. The pitch circle diameter of the annulus gear is twice the size of the pitch circle diameter of the orbiting gear or the planetary gear of the planetary gear system.

Provided on the planetary gear system is an output bearing. The output bearing is provided at a location on the pitch circle diameter of the orbiting gear or planetary gear of the planetary gear system. A ram of a forming machine is supported by the output bearing, for example; in which case a forming tool may be provided on the forming machine. The output bearing moves linearly along an axis when the orbiting planetary gear or orbiting gear of the planetary gear system orbits in the annulus gear.

Referring to the drive device in accordance with the invention, a first planetary gear equalization mass is provided on the planetary gear system. The first planetary gear equalization mass is located diametrically opposite the output bearing relative to the planetary gear axis. Furthermore, at least one and, optionally, additionally, a second eccentric gear equalization mass is provided on the eccentric gear. The first eccentric gear equalization mass is located diametrically opposite the planetary gear axis relative to the annulus gear axis. The optionally second eccentric equalization mass is preferably provided opposite the first eccentric gear equalization mass relative to the annulus gear axis.

As a result of these equalization masses, it is possible to reduce a resultant force and/or a resultant torque on the annulus gear of the drive device and, in the ideal case, eliminate said force entirely. The equalization masses allow not only the reduction or elimination of a resultant force but, in addition, also the reduction or elimination of the resultant torque. Consequently, not only can the wear of the drive device be minimized but, at the same time, the drive device remains more stable and oscillates less during operation. The use of the drive device in a forming machine can improve the quality of the formed body.

Forming machines frequently operate at high stroke rates. In doing so, stresses are applied to the drive devices due to forces of inertia that contribute to the wear of the drive device. Due to the inventive embodiment of the drive device, the stress due to forces of inertia and thus the wear are reduced.

The positions of the masses described in this application, in particular the equalization masses, correspond to the location of the respective point of gravity of the respective mass. In reality, these masses are not punctiform but may extend radially and/or in peripheral direction relative to the axis of rotation.

It is advantageous if an internal rolling surface for the planetary gear system is provided, where an external rolling surface of the orbiting gear of the planetary gear system is in contact with said internal rolling surface. The orbiting gear may have external toothing on its external rolling surface, and the annulus gear may have internal toothing on its internal rolling surface. In particular, an annulus gear plane extends centrally through the internal rolling surface at a right angle to the annulus gear axis.

In preferred exemplary embodiments, the hypocycloid gear assembly is configured asymmetrically. Hence, there exists no plane of symmetry relative to the hypocycloid gear assembly.

The planetary gear system may comprise, in addition to the orbiting gear, at least one orbiting gear connected to the planetary gear. The at least one planetary gear may be configured to form an integral component with the orbiting gear or be connected to the orbiting gear so as to be engageable or disengageable. The at least one planetary gear is arranged at a distance from the annulus gear plane. The output bearing is arranged on one of the existing planetary gears.

One exemplary embodiment of the drive device comprises a planetary gear system with a first planetary gear and a second planetary gear. The two planetary gears are arranged on opposite sides relative to the eccentric gear and the orbiting gear, respectively. The planetary gear system may be configured so as to be symmetrical to the annulus gear plane or a plane parallel thereto. Preferably, the two planetary gears are located outside an annulus gear plane that is defined by the longitudinal center plane of the internal rolling surface of the annulus gear for an orbiting gear or planetary gear. The output bearing for the ram is arranged on the first planetary gear. The first planetary gear equalization mass is located diametrically opposite the output bearing relative to the planetary gear axis. The first planetary gear equalization mass is provided on the first planetary gear. A second planetary gear equalization mass is provided on the second planetary gear. Also in the case of this arrangement, the resultant forces and torques acting on the annulus gear can be reduced or eliminated.

In a preferred exemplary embodiment, the first planetary gear equalization mass and/or the second planetary gear equalization mass and/or the first eccentric gear equalization mass and/or the second eccentric gear equalization mass are located outside the annulus gear plane. In doing so, the first planetary gear equalization mass may be at a first distance, and/or the first eccentric gear equalization mass may be at a second distance, and/or the second eccentric gear equalization mass may be at a third distance, and/or the second planetary gear equalization mass may be at a fourth distance with respect to the annulus gear plane. Preferably, all the distances are different in dimension. In particular, the dimension of first distance is different from the dimension of the second distance and/or the dimension of the third distance and/or the dimension of the fourth distance. Furthermore, the dimension of the second distance may be different from that of the fourth distance.

The eccentric gear may extend through the annulus gear plane. Preferably, the first eccentric gear equalization mass—viewed with respect to the annulus gear plane—is located on the same side as the first planetary gear equalization mass. In addition, it is advantageous if the first eccentric gear equalization mass and the optionally existing second eccentric gear equalization mass are arranged on opposite sides relative to the annulus gear plane. If a second planetary gear equalization mass is provided in the second drive device, said second equalization mass may be provided on the same side as the second eccentric gear equalization mass, relative to the annulus gear plane.

In one exemplary embodiment of the drive device a bearing equalization mass may be provided in addition to the second planetary gear equalization mass on the optional second planetary gear. The bearing equalization mass is preferably arranged diametrically opposite the second planetary gear equalization mass, relative to the planetary gear axis.

In the second drive device, it is of additional advantage if the position of the bearing equalization mass in peripheral direction about the planetary gear axis corresponds to the position of the output bearing in peripheral direction about the planetary gear axis. Additionally or alternatively, the position of the first planetary gear equalization mass in peripheral direction about the planetary gear axis may correspond to the position of the second planetary gear equalization mass in peripheral direction about the planetary gear axis.

Advantageous embodiments of the invention can be inferred from the dependent patent claims, the description and the drawings. The description describes essential features of the invention with reference to exemplary embodiments. Hereinafter, the invention is explained in detail with the use of exemplary embodiment and with reference to the drawings. They show in

Figure 1:
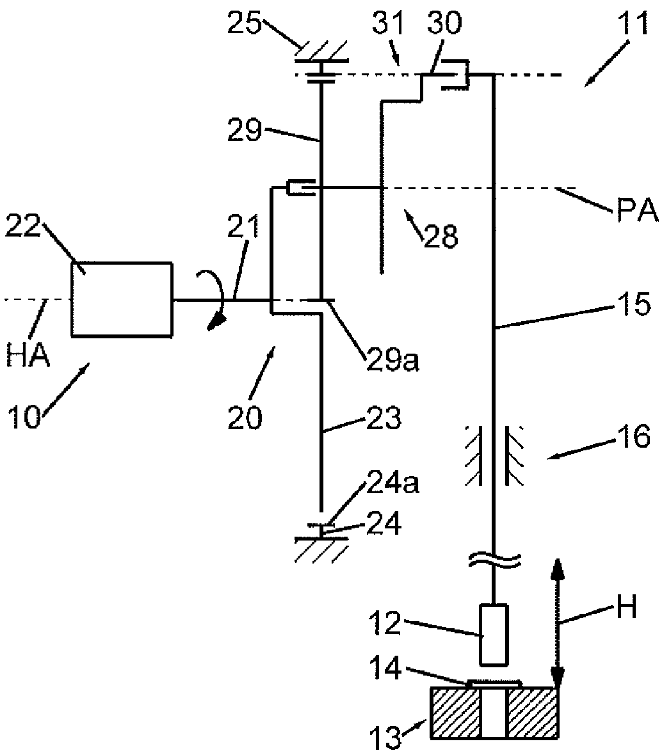
FIG. 1 a principle of a drive device comprising a hypocycloid gear assembly in order to illustrate the basic function of the drive device.
Figure 2:
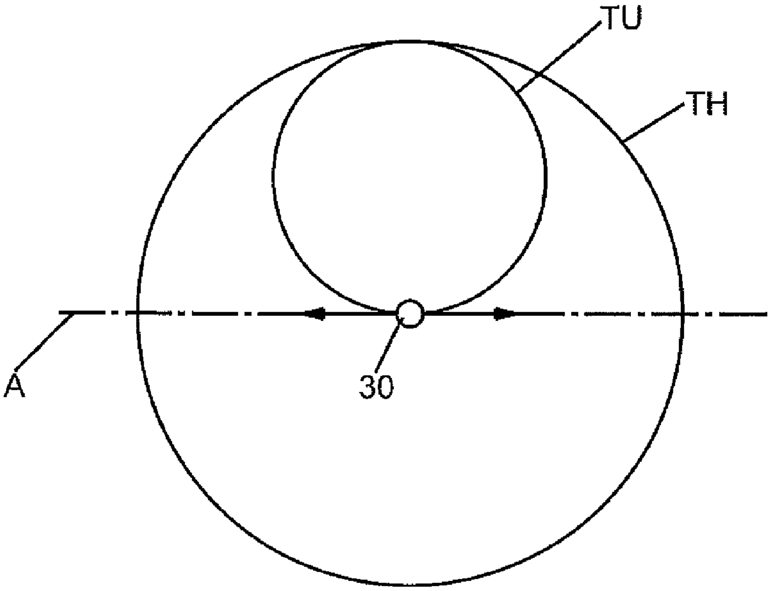
FIG. 2 a schematic representation of different pitch circle diameters of the hypocycloid gear assembly as in FIG. 1 and the movement of the output bearing.

The invention relates to a drive device 10 for a forming machine 11 that is represented by a block circuit diagram in FIG. 1. The forming machine 11 comprises a push rod 12 that performs a stroke movement H along an axis A (FIG. 2). Together with a forming tool 13 interacting with the push rod 12, it is possible to make hollow cylindrical bodies from a starting part 14. The starting part may be a metal sheet, a circular blank or a so-called "cup".

In order to perform the stroke movement, the push rod 12 is mounted to a rod 15. The ram 15 extends along the axis A. This rod may be supported at one or several locations so as to be movable back and forth along the axis A via a bearing arrangement.

Associated with the drive device 10 is a hypocycloid gear assembly 20 that is driven at a drive input 21 by a driving motor 22, for example an electric motor. The drive input 21 is provided on an eccentric gear 23. The hypocycloid gear assembly 20 is further associated with an annulus gear 24 that is provided with internal toothing 24*a*, said toothing representing an internal rolling surface of the annulus gear 24. The internal toothing 24*a* is arranged coaxially about an annulus gear axis HA. The annulus gear 24 is arranged so as to be immovable relative to a machine frame 25 of the forming machine 11.

A planetary gear system 28 of the hypocycloid gear assembly 20 comprises an orbiting gear 29. The orbiting gear 29 has an external rolling surface formed by external toothing 29*a*. The external toothing 29*a* meshes with the internal toothing 24*a* of the annulus gear 24 at the engagement site. The planetary gear system 28 is connected to the eccentric gear 23 in a driving manner. In one drive of the driving motor 22, the eccentric gear 23 moves the orbiting gear 29 in such a manner that said orbiting gear rolls inside the annulus gear 24. In doing so, the planetary gear system 28 is supported so as to be appropriately rotatable relative to the eccentric gear 23.

An output bearing 30 is arranged on the planetary gear system 28, in which case the planetary gear system 28 thus represents a gearing output 31. The ram 15 is supported by the output bearing 30.

In the hypocycloid gear assembly 20, the output bearing 30 is arranged on the pitch circle TU of the orbiting gear 29. During operation of the drive device 10, the pitch circle TU of the orbiting gear 29 rolls in the pitch circle TH of the annulus gear 24, as is schematically illustrated by FIG. 2. The pitch circle diameter of the pitch circle TU of the orbiting gear 29 is half the size of the pitch circle diameter of the pitch circle TH of the annulus gear 24. As a result of this, the output bearing 30 moves linearly along the axis A when the orbiting gear 29 orbits in the annulus gear 24.

Figure 3:
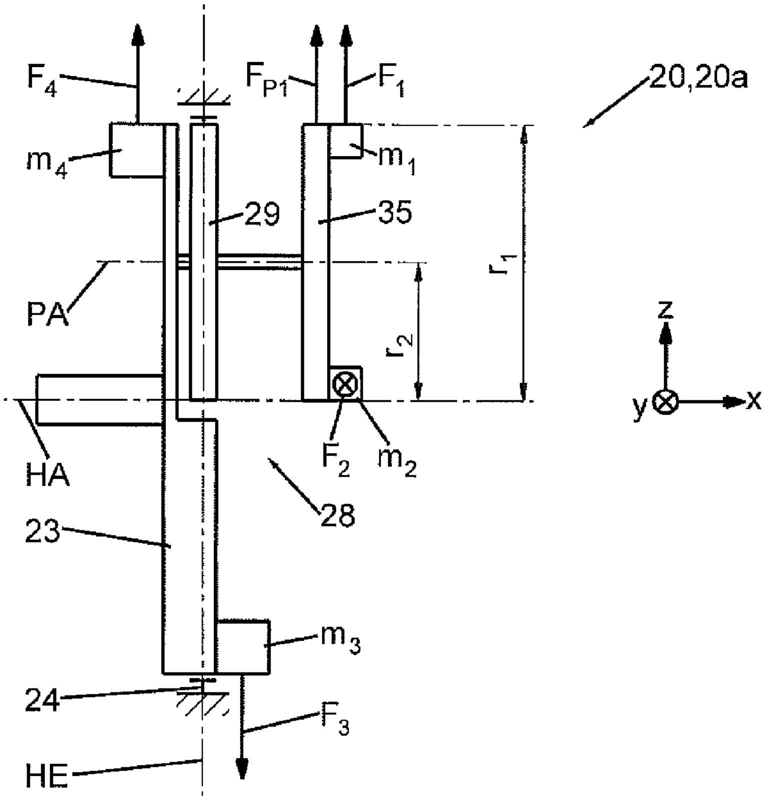
FIG. 3 a schematic representation resembling a block circuit diagram of an exemplary embodiment of a first exemplary embodiment of the drive device.

FIG. 3 shows a first exemplary embodiment **20*a* of a hypocycloid gear assembly 20 for a first embodiment of the drive device 10, schematized in a block circuit diagram. An annulus gear plane HE extends at a right angle relative to the annulus gear axis HA. The annulus gear plane HE extends centrally through the internal rolling surface formed by internal toothing 24*a*. The orbiting gear 29 of the planetary gear system 28 is preferably centered relative to the annulus gear plane HE. The eccentric gear 23 extends through the annulus gear plane HE. In order to support the orbiting gear 29 or the planetary gear system 28, the eccentric gear 23 may have a recess at a peripheral point so that the eccentric gear is not rotation-symmetrical relative to its axis of rotation that, in accordance with the example, coincides with the annulus gear axis HA. A first planetary gear 35 is rigidly connected to the orbiting gear 29. The first planetary gear 35 and the orbiting gear 29** may also be configured in one piece as one cylindrical component.

The output bearing 30 is arranged on the first planetary gear 35, where the ram 15 and the push rod 12 are located. This results in a first mass $m_1$ that is to be driven. The maximum first radial distance $r_1$ of the first mass $m_1$ of the annulus gear axis HA is shown in FIG. 3. A first planetary gear equalization mass $m_2$ is arranged on the first planetary gear 35 relative to the planetary gear axis PA diametrically opposite the first mass $m_1$, i.e., diametrically opposite the output bearing 30. The planetary gear axis PA or the point of gravity of the planetary gear system 28 is at a second radial distance $r_2$ from the annulus gear axis HA.

Arranged on the eccentric gear 23 is a first eccentric gear equalization mass $m_3$. This first eccentric gear equalization mass $m_3$ is arranged—relative to the annulus gear plane HE—on the same side as the first planetary gear equalization mass $m_2$. On the opposite side of the annulus gear plane HE—relative to the annulus gear axis HA and diametrically opposite the first eccentric gear equalization mass $m_3$—there is arranged a second eccentric gear equalization mass $m_4$ on the eccentric gear 23. The second eccentric gear equalization mass $m_3$ is located opposite the annulus gear axis HA, diametrically opposite the planetary gear axis PA.

Due to the various masses, a force is generated on the respective annulus gear 24: The first mass $m_1$ generates a first force $F_1$, the first planetary gear equalization mass $m_2$ generates a second force $F_2$, the first eccentric gear equalization mass $m_3$ generates a third force $F_3$, the second eccentric gear equalization mass $m_4$ generates a fourth force $F_4$, and the first planetary gear 35 generates a planetary gear force $F_{P1}$. In doing so, the following relationships apply:

$$F_1=m_1 \cdot r_1 \cdot \omega^2 \cdot \cos(\omega t) \quad (1)$$

$$F_2=m_2 \cdot r_1 \cdot \omega^2 \cdot \sin(\omega t) \quad (2)$$

wherein (1) and (2) with $m_{12}=m_1=m_2$ result in:

$$F_{12}=m_{12} \cdot r_1 \cdot \omega^2 \quad (3)$$

$$F_3=m_3 \cdot r_1 \cdot \omega^2 \quad (4)$$

$$F_{P1}=m_{P1} \cdot r_2 \cdot \omega^2 \quad (5)$$

wherein $m_{P1}$ is the mass of the first planetary gear 35.

In order for the forces acting on the annulus gear 24 to equalize, the following must be satisfied:

$$0 \overset{!}{=} F_{12} + F_{P1} - F_3 + F_4 \quad (6)$$

Equation (6) then results in:

$$m_3 = m_{12} + m_4 + \frac{r_2}{r_1} \cdot m_{P1} \quad (7)$$

Figure 4:
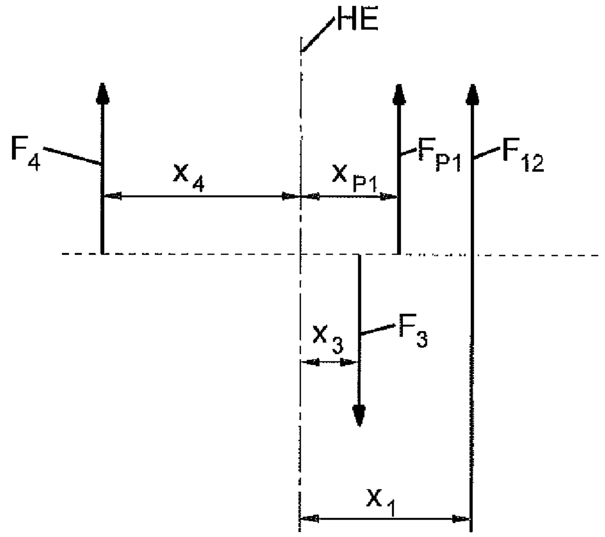
FIG. 4 the forces or torques resulting from the exemplary embodiment as in FIG. 3 and acting on the annulus gear.

FIG. 4 shows a graph of the distances and the masses, respectively, from the annulus gear plane HE. The first planetary gear equalization mass $m_2$ is at a first distance $x_1$ from the annulus gear plane HE. The first eccentric gear equalization mass $m_3$ is at a second distance $x_3$, and the second eccentric gear equalization mass $M_4$ is at a third distance $x_4$ from the annulus gear plane HE. The point of gravity of the first planetary gear 35 is at a fourth distance $x_{P1}$ from the annulus gear plane HE. In order for the torques resulting from the forces on the annulus gear 24 to be equalized, the following relationship must be satisfied:

$$0 \overset{!}{=} x_1 \cdot F_{12} + x_{P1} \cdot F_{P1} - x_3 \cdot F_3 - x_4 \cdot F_4 \quad (8)$$

Using equation (8) as well as the equalization of the forces on the annulus gear 24, it is possible to determine the equalization masses, so that, during the operation of the drive device 10 and the first hypocycloid gear assembly **20*a*, respectively, the resultant force, as well as the resultant torque, on the annulus gear 24** can be eliminated in the ideal case or at least reduced.

Figure 5:
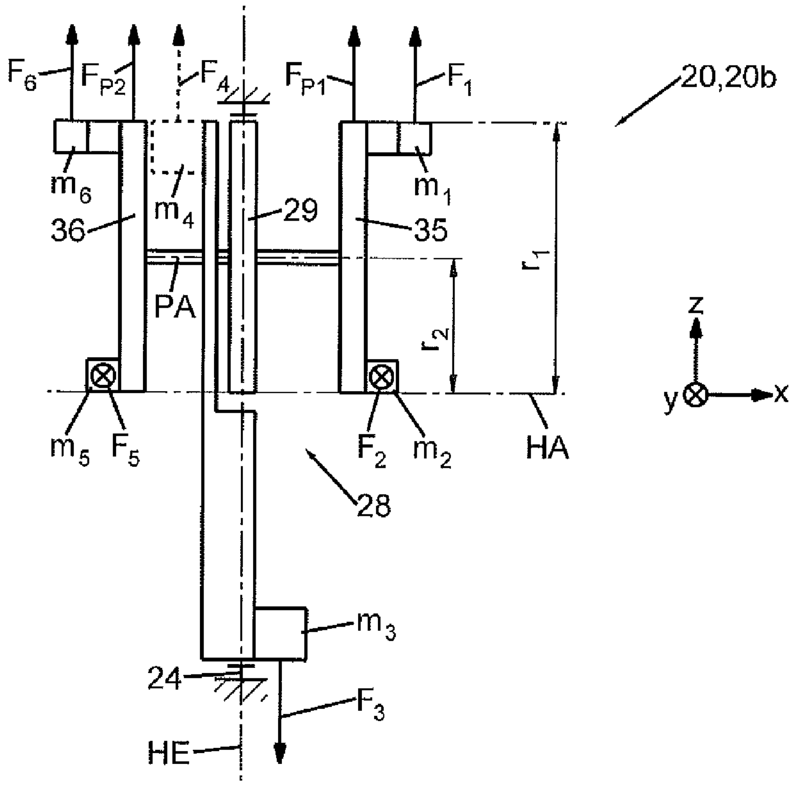
FIG. 5 a schematic representation resembling a block circuit diagram of a second exemplary embodiment of the drive device.

FIG. 5 shows an additional, second embodiment of a hypocycloid gear assembly **20*b* for a second drive device 10. Different from the first hypocycloid gear assembly 20*a*, the second hypocycloid gear assembly 20*b* uses a modified planetary gear system 28. In addition to the first planetary gear 35, the planetary gear system 28 has a second planetary gear 36. The second planetary gear 36 may have essentially the same configuration as the first planetary gear 35. The two planetary gears 35, 36 are arranged on opposite sides relative to the annulus gear plane HE. A second planetary gear equalization mass $m_5$ and, in accordance with the example, also a bearing equalization mass $m_6$, are arranged on the second planetary gear 36. The second planetary gear equalization mass $m_5$ and the bearing equalization mass $m_6$ are arranged, relative to the planetary gear axis PA, diametrically opposite on the second planetary gear 36. In peripheral direction about the planetary gear axis PA, the second planetary gear equalization mass $m_5$ has the same position as the first planetary gear equalization mass $m_2$ of the first planetary gear 35. Accordingly, the bearing equalization mass $m_6$ has preferably the same position as the first mass $m_1$, i.e., that output bearing 30**, in peripheral direction about the planetary gear axis PA.

In the exemplary embodiment of the second hypocycloid gear assembly **20*b* described here, it is possible to omit the second eccentric gear equalization mass $m_4$. Likewise, in the first hypocycloid gear assembly 20***a*, it is possible—in a modified embodiment—to optionally omit the second eccentric gear equalization mass $m_4$.

Analogous to the description of the first exemplary embodiment, a fifth force $F_5$ results from the second planetary gear equalization mass $M_5$ and a sixth force $F_6$ from the bearing equalization mass $m_6$, as follows:

$$F_5 = m_5 \cdot r_1 \cdot \omega^2 \cdot \sin(\omega t) \quad (9)$$

$$F_6 = m_6 \cdot r_1 \cdot \omega^2 \cdot \cos(\omega t) \quad (10)$$

Due to the mass $m_{P2}$ of the second planetary gear 36, there results a second planetary gear force $F_{P2}$, namely:

$$F_{P2} = m_{P2} \cdot r_2 \cdot \omega^2 \quad (11)$$

The fifth force $F_5$ and the sixth force $F_6$ can be used analogously to equations (1) to (3) where $m_{56}=m_5=m_6$ to determine the following equation:

$$F_{56} = m_{56} \cdot r_1 \cdot \omega^2 \quad (12)$$

Figure 6:
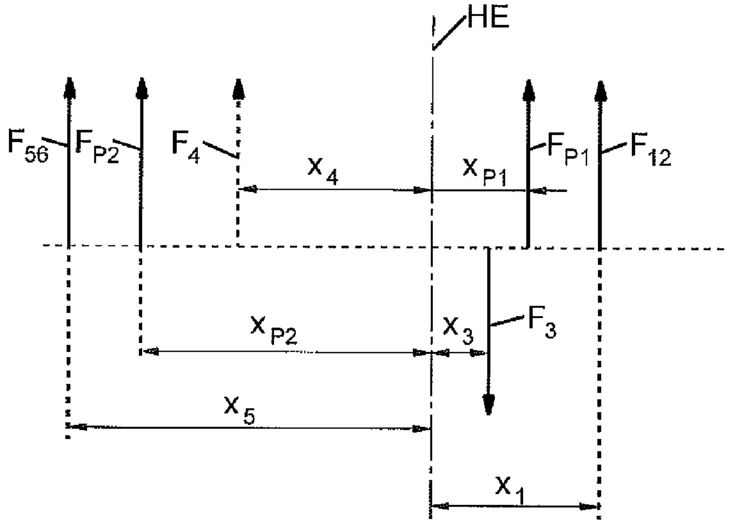
FIG. 6 the schematic illustration of the resultant forces and torques acting on the annulus gear in the exemplary embodiment of FIG. 5.

The distances in axial direction (x-direction) from the annulus gear plane HE of the masses or the points of contact of the forces of the exemplary embodiment of FIG. 5 are schematically illustrated in FIG. 6. The force $F_{56}$ resulting from the fifth force $F_5$ and the sixth force $F_6$ is at a fifth distance $x_5$ from the annulus gear plane HE, and the point of gravity of the second planetary gear 36 is at a sixth distance $x_{P2}$ from the annulus gear plane HE. The remaining forces are analogous to the first hypocycloid gear assembly 20*a*, as is shown in FIGS. 3 and 4 and described hereinabove.

Corresponding to the first hypocycloid gear assembly 20*a*, it is also possible to provide an at least partial force equalization and torque equalization for the second hypocycloid gear assembly 20*b*. Based thereon, it is possible to then determine the individual masses in order to optimize the second hypocycloid gear assembly 20*b* such that the lowest possible resultant forces and torques act on the annulus gear 24.

The invention relates to a drive device 10 for a forming machine 11. The drive device 10 comprises a hypocycloid gear assembly 20. The hypocycloid gear assembly 20 comprises an eccentric gear 23, a stationary annulus gear 24 and a planetary gear system 28. The planetary gear system 28 includes an orbiting gear 29 orbiting and rolling in an annulus gear 24. The orbiting gear 29 is connected to at least one first planetary gear 35 of the planetary gear system 28. Alternatively, a planetary gear 35, 36 each may be arranged on opposite sides of the orbiting gear 29. On the first planetary gear 35, there is provided a first planetary gear equalization mass $m_2$ diametrically opposite an output bearing. At least one first eccentric gear equalization mass $m_3$ and, optionally, a second eccentric gear equalization mass $m_4$, are arranged on the eccentric gear 23. The first eccentric gear equalization mass $m_3$ is arranged diametrically opposite, relative to a planetary gear axis PA about which the planetary gear system 28 rotates. The resultant forces and torques acting on the annulus gear 24 can at least be reduced by the equalization masses.

LIST OF REFERENCE SIGNS

10 Drive device
11 Forming machine
12 Push rod
13 Forming tool
14 Starting part
15 Ram
16 Bearing arrangement
20 Hypocycloid gear assembly
20*a* First hypocycloid gear assembly
20*b* Second hypocycloid gear assembly
21 Drive input
22 Driving motor
23 Eccentric gear
24 Annulus gear
24*a* Internal toothing
25 Machine frame
28 Planetary gear system
29 Orbiting gear
29*a* External toothing
30 Output bearing
31 Gearing output
35 First planetary gear
36 Second planetary gear
A Axis
H Stroke movement
HA Annulus gear axis
HE Annulus gear plane
PA Planetary gear axis
$F_1$ First force
$F_2$ Second force
$F_3$ Third force
$F_4$ Fourth force
$F_{P1}$ First orbiting gear force
$m_1$ First mass
$m_2$ First planetary gear equalization mass
$m_3$ First eccentric gear equalization mass
$m_4$ Second eccentric gear equalization mass
$m_5$ Second planetary gear equalization mass
$m_6$ Bearing equalization mass
$m_{P1}$ Mass of the first planetary gear
$m_{P2}$ Mass of the second planetary gear
$r_1$ First radial distance
$r_2$ Second radial distance
TH Pitch circle of the annulus gear
TU Pitch circle of the orbiting gear
$x_1$ First distance
$x_3$ Second distance
$x_4$ Third distance
$x_{P1}$ Fourth distance
$x_5$ Fifth distance
$x_{P2}$ Sixth distance

What is claimed is:

1. Drive device (10) for a forming machine (11), the drive device comprising:

a hypocycloid gear assembly (20*a*) comprising a planetary gear system (28) having an annulus gear (24) arranged coaxially with respect to an annulus gear axis (HA), an orbiting gear (29) orbiting in the annulus gear (24) and being rotatable about a planetary gear axis (PA) and being in a driven connection with an eccentric rotating element (23), and a first planetary rotating element (35) rigidly connected to the orbiting gear (29) and having a mass $m_{p1}$, an output bearing (30) arranged on the planetary gear system (28), a ram (15) and push rod (12) connected to the output bearing (30) to provide a first mass ($m_1$) driven by the planetary gear system (28), a first planetary gear equalization mass ($m_2$) being arranged on the planetary system (28) and being diametrically opposite the output bearing (30), relative to the planetary gear axis (PA), a first eccentric gear equalization mass ($m_3$) being arranged on the eccentric rotating element (23) and being diametrically opposite the planetary gear axis (PA), relative to the annulus gear axis (HA), a second eccentric gear equalization mass ($m_4$) arranged on the eccentric rotating element (23), said second eccentric equalization mass being located diametrically opposite the first eccentric gear equalization mass ($m_3$), relative to the annulus gear axis (HA), an internal toothing (24*a*) for the planetary gear system (28) provided on the annulus gear (24) that meshes with external toothing (29*a*) of an orbiting gear (29) of the planetary gear system (28), wherein the annulus gear (24) defines, at a right angle to the annulus gear axis (HA), an annulus gear plane (HE) that corresponds to a longitudinal center plane through the internal rolling surface (241) on the annulus gear (24), wherein the first planetary gear equalization mass ($m_2$) and the first eccentric gear equalization mass ($m_3$), and/or the second eccentric gear equalization mass ($m_4$) are located outside the annulus gear plane (HE), wherein the first planetary gear equalization mass ($m_2$) is at a first distance ($x_1$) with respect to the annulus gear plane (HE), and that the first eccentric gear equalization mass ($m_3$) is at a second distance ($x_3$) with respect to the annulus gear plane (HE), and that the second eccentric gear equalization mass ($m_4$) is at a third distance ($x_4$) with respect to the annulus gear plane (HE), wherein during operation of the drive device, the first mass ($m_1$) generates a first force $F_1$, the first planetary gear equalization mass ($m_2$) generates a second force $F_2$, the first eccentric gear equalization mass ($m_3$) generates a third force $F_3$, the second eccentric gear equalization mass ($m_4$) generates a fourth force $F_4$, and the first planetary rotating element (35) generates a planetary gear force $F_{P1}$, which are related according to $0=F_{12}+F_{p1}-F_3+F_4$ and $0=x_1\cdot F_{12}+X_{p1}\cdot F_{p1}-x_3\cdot F_3+x_4\cdot F_4$, where $m_{12}=m_1=m_2$ and $F_{12}$ is force resulting from the first force $F_1$ and the second force $F_2$.

2. Drive device as in claim 1, wherein a dimension of the first distance ($x_1$) is different from a dimension of the second distance ($x_3$) and/or the third distance ($x_4$).

3. Drive device as in claim 1, wherein the dimension of the second distance ($x_3$) is different from a dimension of the third distance ($x_4$).

4. Drive device as in claim 1, wherein the first eccentric gear equalization mass ($m_3$) and the second eccentric gear equalization mass ($m_4$) are arranged on opposite sides relative to the annulus gear plane (HE).

5. Drive device as in claim 1, wherein the first planetary gear equalization mass ($m_2$) and the first eccentric gear equalization mass ($m_3$) are arranged on the same side, relative to the annulus gear plane (HE).

6. Drive device as in claim 1, wherein the planetary gear system (28) comprises the first planetary rotating element (35) and a second planetary rotating element (36) that are arranged on opposite sides relative to the eccentric rotating element (23), wherein the first planetary gear equalization mass ($m_2$) is arranged on the planetary rotating element (35) and is located diametrically opposite the output bearing (30), relative to the planetary gear axis (PA), and that a second planetary gear equalization ($m_5$) is arranged on the second planetary rotating element (36).

7. Drive device as in claim 6, wherein a bearing equalization mass ($m_6$) is arranged on the second planetary rotating element (36).

8. Drive device as in claim 7, wherein the second planetary gear equalization mass ($m_5$) is located diametrically opposite the bearing equalization mass ($m_6$), relative to the planetary axis (PA).

9. Drive device as in claim 8, wherein a position of the bearing equalization mass ($m_6$) in peripheral direction about the planetary gear axis (PA) corresponds to the output bearing's (30) position in peripheral direction about the planetary gear axis (PA), and/or that the first planetary gear equalization mass's ($m_2$) position in peripheral direction about the planetary axis (PA) corresponds to the second planetary gear equalization mass's ($m_5$) position in peripheral direction about the planetary gear axis (PA).

10. Forming machine (11) for the production of hollow cylindrical bodies from a starting part (14), the forming machine comprising:

a drive device (10) comprising:

a hypocycloid gear assembly (20*a*) comprising a planetary gear system (28) having an annulus gear (24) arranged coaxially with respect to an annulus gear axis (HA), an orbiting gear (29) orbiting in the annulus gear (24) and being rotatable about a planetary gear axis (PA) and being in a driven connection with an eccentric rotating element (23), and a first planetary rotating element (35) rigidly connected to the orbiting gear (29) and having a mass $m_{p1}$, an output bearing (30) arranged on the planetary gear system (28), a ram (15) and push rod (12) connected to the output bearing (30) to provide a first mass ($m_1$) driven by the planetary gear system (28), a first planetary gear equalization mass ($m_2$) being arranged on the planetary gear system (28) and being diametrically opposite the output bearing (30), relative to the planetary gear axis (PA), and a first eccentric gear equalization mass ($m_3$) being arranged on the eccentric rotating element (23) and being diametrically opposite the planetary gear axis (PA), relative to the annulus gear axis (HA), a second eccentric gear equalization mass ($m_4$) arranged on the eccentric rotating element (23), said second eccentric equalization mass being located diametrically opposite the first eccentric gear equalization mass ($m_3$), relative to the annulus gear axis (HA), an internal toothing (24*a*) for the planetary gear system (28) provided on the annulus gear (24) that meshes with external toothing (29*a*) of an orbiting gear (29) of the planetary gear system (28), wherein the annulus gear (24) defines, at a right angle to the annulus gear axis (HA), an annulus gear plane (HE) that corresponds to a longitudinal center plane through the internal rolling surface (241) on the annulus gear (24), wherein the first planetary gear equalization mass ($m_2$) and the first eccentric gear equalization mass ($m_3$), and/or the second eccentric gear equalization mass ($m_4$) are located outside the annulus gear plane (HE), wherein the first planetary gear equalization mass ($m_2$) is at a first distance ($x_1$) with respect to the annulus gear plane (HE), and that the first eccentric gear equalization mass ($m_3$) is at a second distance ($x_3$) with respect to the annulus gear plane (HE), and that the second eccentric gear equalization mass ($m_4$) is at a third distance ($x_4$) with respect to the annulus gear plane (HE), wherein during operation of the drive device, the first mass ($m_1$) generates a first force $F_1$, the first planetary gear equalization mass ($m_2$) generates a second force $F_2$, the first eccentric gear equalization mass ($m_3$) generates a third force $F_3$, the second eccentric gear equalization mass ($m_4$) generates a fourth force $F_4$, and the first planetary rotating element (35) generates a planetary gear force $F_{p1}$, which are related according to $0=F_{12}+F_{p1}-F_3+F_4$ and $0=x_1 \cdot F_{12}+X_{p1} \cdot F_{p1}-x_3 \cdot F_3+x_4 \cdot F_4$, where $m_{12}=m_1=m_2$ and $F_{12}$ is force resulting from the first force $F_1$ and the second force $F_2$.

* * * * *